(12) United States Patent
Kita et al.

(10) Patent No.: US 6,430,611 B1
(45) Date of Patent: Aug. 6, 2002

(54) METHOD AND APPARATUS FOR PROVIDING DATA STORAGE MANAGEMENT

(75) Inventors: Jefferson A. Kita, Newton; Thomas J. Bakerman, Acton; Peter J. Chestna, Auburn; Ellen L. Dickau, Carlisle; Sean Gilhooly, Marlboro; Stephen M. Glassman, Framingham; Mark B. Hecker, Marlboro; Cora A. Wong, Andover, all of MA (US)

(73) Assignee: Highground Systems, Inc., Marlborough, MA (US)

( * ) Notice: Subject to any disclaimer, the term of this patent is extended or adjusted under 35 U.S.C. 154(b) by 0 days.

(21) Appl. No.: 09/139,303

(22) Filed: Aug. 25, 1998

(51) Int. Cl.[7] .............................................. G06F 15/173
(52) U.S. Cl. ....................... 709/223; 709/224; 709/226
(58) Field of Search ................................. 709/223, 220, 709/226, 224, 203, 221, 202

(56) References Cited

U.S. PATENT DOCUMENTS

| | | | |
|---|---|---|---|
| 5,655,081 A | | 8/1997 | Bonnell et al. ......... 395/200.32 |
| 5,870,555 A | * | 2/1999 | Pruett et al. ................. 709/223 |
| 5,920,700 A | * | 7/1999 | Gordon et al. .............. 709/226 |
| 5,959,860 A | * | 9/1999 | Styczinski .................. 364/141 |
| 5,978,594 A | | 11/1999 | Bonnell et al. ............. 395/837 |
| 6,009,466 A | * | 12/1999 | Axberg et al. .............. 709/220 |
| 6,041,347 A | * | 3/2000 | Harsham et al. ............ 709/220 |
| 6,049,827 A | * | 4/2000 | Sugauchi et al. ........... 709/223 |
| 6,054,987 A | * | 4/2000 | Richardson ................. 345/348 |
| 6,076,990 A | * | 6/2000 | Frazier ........................ 711/114 |
| 6,078,955 A | * | 6/2000 | Konno et al. ............... 709/224 |
| 6,098,128 A | * | 8/2000 | Velez-McCaskey et al. .. 710/65 |
| 6,137,762 A | * | 10/2000 | Sharon et al. .............. 370/255 |
| 6,253,240 B1 | * | 6/2001 | Axberg et al. .............. 709/223 |
| 6,269,400 B1 | * | 7/2001 | Doublas et al. ............. 709/224 |
| 6,314,460 B1 | * | 11/2001 | Knight et al. ............... 709/212 |
| 6,327,620 B1 | * | 12/2001 | Tams et al. ................. 709/224 |

* cited by examiner

*Primary Examiner*—Dung C. Dinh
*Assistant Examiner*—Abdullahi E. Salad
(74) *Attorney, Agent, or Firm*—Mintz, Levin, Cohn, Ferris, Clovsky, and Popeo, P.C.

(57) ABSTRACT

A storage management system for managing storage resources of a plurality of computer devices in a computer network includes a plurality of management agents, each of which is installed in a corresponding one of the plurality of computer devices, and each of which is configured to compile storage information of storage resources accessible by the corresponding computer device to create a first set of compiled storage information, and a storage manager installed in the server. The storage manager is configured to collect the first set of compiled storage information from each of the management agents and to further compile the first sets of storage information received to create a second set of compiled storage information. The storage management system further includes a user interface operatively coupled to the server manager to allow a user to access the second set of compiled storage information.

34 Claims, 7 Drawing Sheets

METHOD AND APPARATUS FOR PROVIDING DATA STORAGE MANAGEMENT

FIELD OF THE INVENTION

The present invention relates generally to a method and apparatus for providing data storage management, and more specifically to a method and apparatus for managing storage resource devices coupled to computers of a computer network.

BACKGROUND OF THE INVENTION

Prior art storage management systems allow operators of a computer system to view and manage storage resources, including fixed magnetic disks, removable media (e.g., tapes, optical disks, removable magnetic disks), stand-alone drives, robotic libraries (e.g., autoloaders, changers, jukeboxes), and RAID (redundant array of inexpensive disks) devices. These prior art systems typically operate on a per computer basis to allow an operator to perform storage management functions such as determining available storage space in the storage resources and allocating the storage space among applications running on the computer system and among users of the computer system. Prior art products for providing storage management include File Explorer available from Microsoft Corporation of Redmond, WA and NTP Quota Manager available from NTP of Manchester, N.H.

The use of computer networks, in which two or more computer systems are operatively coupled together is widespread and still increasing. Personal computer networks based on the Windows NT® operating system available from Microsoft and based on other operating systems are being used extensively to allow users of personal computers to communicate and share resources with other users. Network management products exist which allow a computer network administrator to monitor and manage data flow through routers and hubs of computer networks. However, in typical computer networks, to monitor and manage storage resources of the computer systems of the network, a network administrator must physically visit and logon to each of the computer systems in the network. The number of computers in typical computer networks is increasing from tens of computers to thousands of computers, and the time required by a network administrator to visit each computer makes it difficult or nearly impossible to effectively manage storage resources by physically visiting each computer.

It is desirable to provide a storage management system that allows a network administrator to centrally monitor and manage storage resources coupled to computer systems in a computer network.

SUMMARY OF THE INVENTION

Embodiments of the present invention provide a method and apparatus that enables central monitoring and management of storage resources coupled to computer systems in a computer network.

In one general aspect, the invention features a storage management system for managing storage resources of a plurality of computer devices in a computer network having a server, operatively coupled to each of the plurality of computer devices. The storage management system includes a plurality of management agents, each of which is installed in a corresponding one of the plurality of computer devices, and each of which is configured to compile storage information of storage resources accessible by the corresponding computer device to create a first set of compiled storage information, a storage manager installed in the server and operatively coupled to each of the plurality of management agents through the computer network, the server manager being configured to collect the first set of compiled storage information from each of the management agents and to further compile the first sets of storage information received to create a second set of compiled storage information, and a user interface operatively coupled to the server manager to allow a user to access the second set of compiled storage information.

The plurality of computer devices can include a first group of computer devices and a second group of computer devices, wherein each of the first group and the second group have computer devices of a first type, and wherein the storage manager is configured to compile storage information of the first type of computer devices in the first group with storage information of the first type of computer devices in the second group to create a third set of storage information. The computer devices can be categorized as being one of the first type or the second type based on characteristics of users of the computer devices. The user interface can include a web browser to access the storage manager. One of the plurality of management agents can be installed in the server to manage storage resources of the server. The user interface can be installed in one of the computers of the computer network containing one of the plurality of management agents, or the user interface can be installed in the server, or the user interface can be installed in any computer capable of accessing the server. The storage manager can be constructed and arranged to collect information from computers of the computer network having a management agent and to collect information from computers of the computer network that do not contain a management agent.

In another general aspect, the invention features a method for managing storage resources of a plurality of computer devices in a computer network. The method includes steps of compiling, for each computer of the computer network, storage information of storage resources accessible by the computer to create a first set of compiled storage information, collecting the first set of compiled storage information from each of the computers, compiling the first sets of storage information collected to create a second set of compiled storage information, storing the second set of compiled information, and accessing the second set of compiled information.

The step of storing can include storing the-storage-information in a database contained in a server of the computer network. The step of accessing can include accessing the database of the server using a web browser. The step of accessing can include a step of further compiling the storage information contained in the database. At least one of the steps of compiling can include a step of compiling data according to types of users of computers of the computer network. The step of accessing can include accessing the second set of compiled information using a web browser.

In still another general aspect of the present invention, a storage management system for managing storage resources of a plurality of computer devices in a computer network includes first means, included within each one of the computers of the computer network, for compiling storage information of storage resources accessible by the one of the computers to create a first set of compiled storage information, means, coupled to the first means, for collecting the first set of compiled storage information from each of the computers, second means, coupled to the means for collecting, for compiling the first sets of storage information collected to create a second set of compiled storage information, and user interface means for accessing the second set of compiled information.

The means for collecting can include means for storing the storage information in a database. The user interface means can include a web browser. The user interface means can include means for further compiling the storage information contained in the database. At least one of the first means for compiling and the second means for compiling can include means for compiling data according to types of users of computers of the computer network.

BRIEF DESCRIPTION OF THE DRAWINGS

For a better understanding of the present invention, reference is made to the drawings which are incorporated herein by reference and in which.

DETAILED DESCRIPTION

Figure 1:
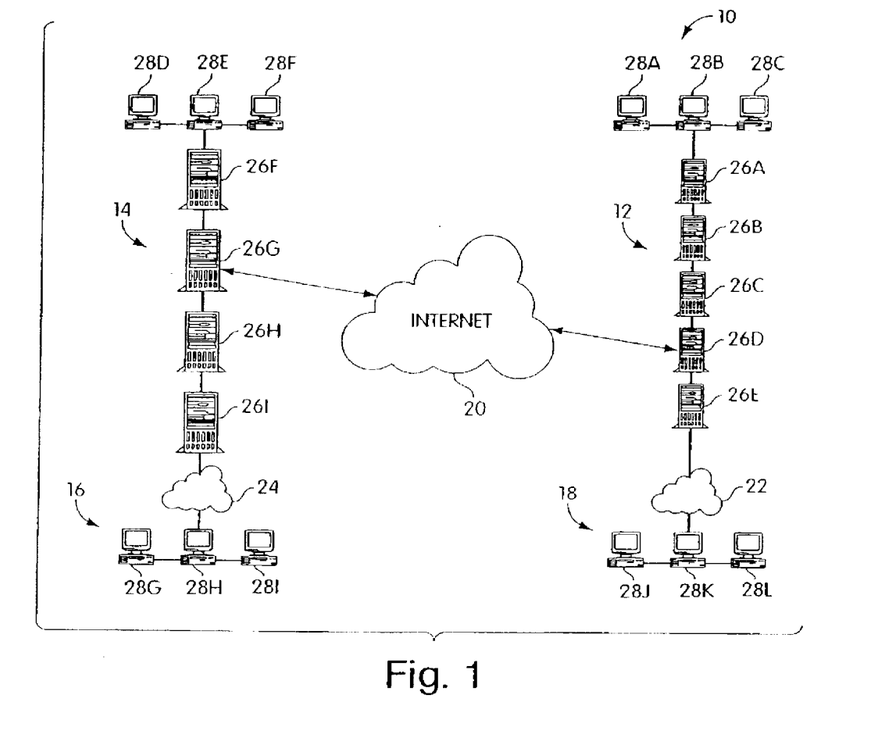
FIG. 1 shows a block diagram of a computer network used with embodiments of the present invention.

A computer network 10 used with one embodiment of the present invention is shown in FIG. 1. The computer network 10 includes four local area networks 12, 14, 16 and 18 coupled together through wide area networks 20, 22 and 24. Wide area network 20 provides connectivity between local area networks 12 and 14 over the internet. Wide area networks 22 and 24 may also be implemented over the internet or may be implemented using a dialup connection or dedicated phone lines. Local area network 12 includes five computer systems 26A–26E configured as network servers, and three computer systems 28A, 28B and 28C configured as workstations. Similarly, local area network 14 includes four network servers 26F–26I and three workstations 28D–28F. Local area network 16 has three workstations 28G–28I, and local area network 18 also has three workstations 28H–28K.

Each of the workstations and the servers includes storage resources, such as fixed magnetic disks, removable media, stand-alone drives, robotic libraries and RAID devices as is known in the art. The storage resources are used to store program files for applications loaded in the workstations and servers and to store work files of users of the workstations and servers. In one embodiment of the present invention, each of the workstations and network servers within one of the local area networks communicates with other workstations and servers within the network using the Windows NT® operating system.

As will be described below in further detail, embodiments of the present invention provide a storage resource management system that allows a network administrator to monitor and manage the storage resources of the workstations and servers contained within the computer network 10 from one of the workstations 28A–28L or from a computer terminal (i.e., a display device and keyboard) coupled to one of the servers.

Figure 2:
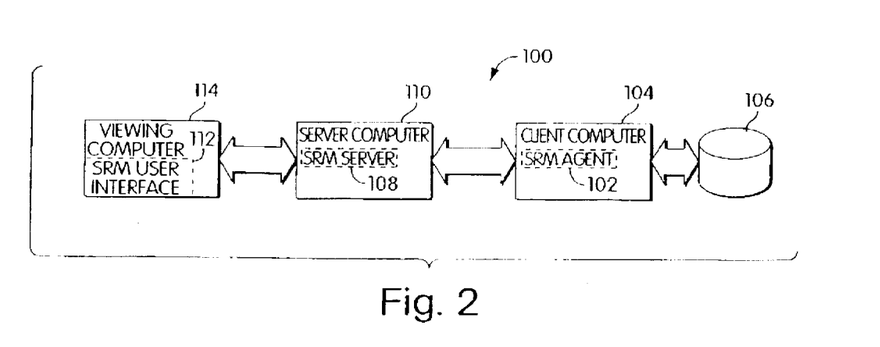
FIG. 2 shows a block diagram of the architecture of a storage resource management system in accordance with one embodiment of the present invention.

A block diagram showing the basic architecture of a storage resource management system 100 in accordance with one embodiment of the present invention is shown in FIG. 2. The storage resource management system 100 includes a storage resource manager (SRM) agent 102 installed in a client computer 104 having storage resources 106, an SRM server 108 installed in a network server 110, and an SRM user interface 112 installed in a viewing computer 114.

In embodiments of the present invention, one SRM agent is installed in each network computer (workstation or server) that has storage resources to be managed by the SRM management system. For example, in an implementation of the storage resource management system of the present invention in the computer network 10 of FIG. 1, an SRM agent may be installed in each of the workstations 28, and in each of the servers 26. The SRM server is installed in one of the servers 26. In one embodiment, the SRM management system has only one SRM server. The SRM user interface 112 may be installed in any workstation capable of accessing the SRM server, and in one embodiment, the SRM user interface is implemented using hyperlinked web pages that are displayed using a standard web browser.

Figure 3:
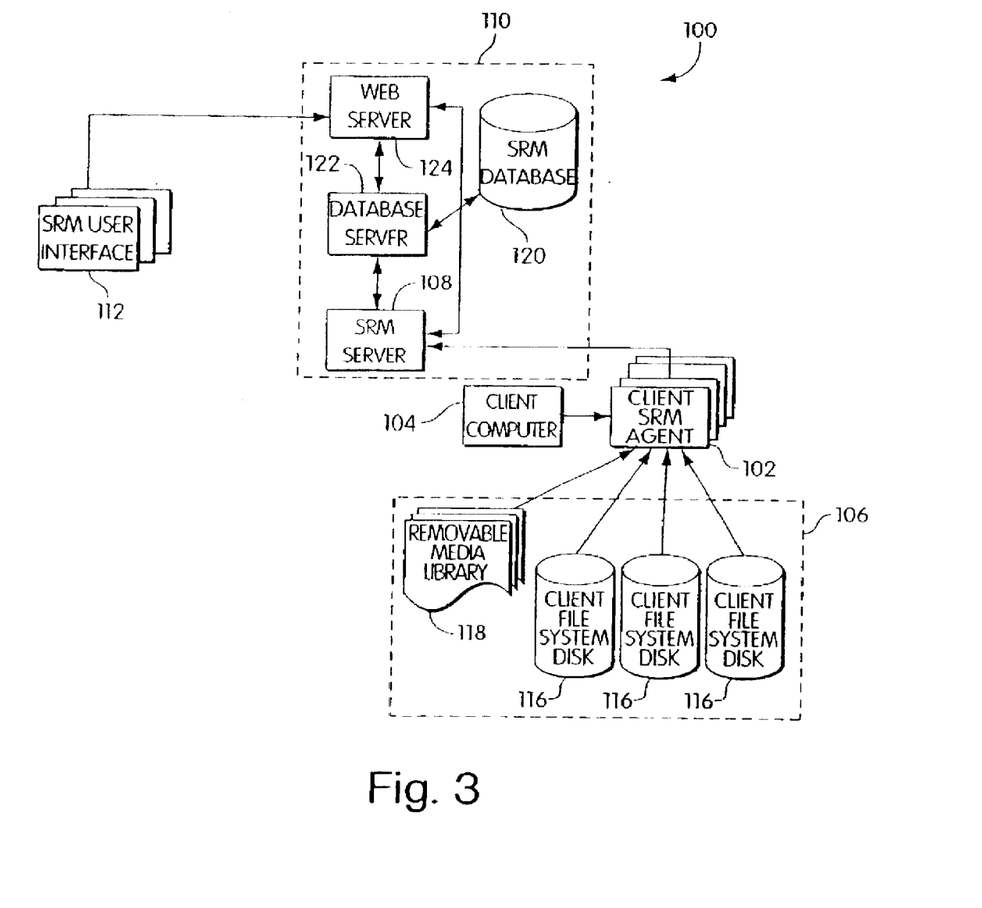
FIG. 3 shows a detailed block diagram of the storage resource management system of FIG. 2.

A more detailed block diagram of the storage resource management system 100 is shown in FIG. 3. As shown in FIG. 3, the storage resources of a client computer 104 may include a plurality of disks 116 and a removable media library 118. The server computer 110 containing the SRM server 108 also contains a database server 122, a web server 124 and an SRM database 120. As described below in greater detail, the SRM database 120 stores storage resource management information for the client computers of the computer network. The database server 122 provides the interface between the SRM server 108 and the SRM database 120. The web server 124 provides the interface between the SRM server 108 and the SRM user interface 112. The database server, SRM database and web server may be co-located with the SRM server in the network server 110, as shown in FIG. 3, or alternatively, the database server and SRM database may be located in a separate network server from the SRM server.

The storage resource management system 100 operates as follows. The storage resource manager agents gather information from the computers on which they are installed, process the information, and in response to requests from the SRM server, the SRM agents pass the processed information to the SRM server. The SRM server performs additional processing of the information received from the SRM agents and stores the information in the SRM database. The information stored in the SRM database is accessible to a user of the SRM system through the SRM user interface. In response to queries from a user through the user interface, the SRM server processes and formats information stored in the SRM database and sends the processed, formatted information to the user interface where it can be viewed by the user.

In embodiments of the present invention, the agent gathers information related to: capacity of storage resources of its client computer; available storage space in each of the storage resources; number and size of files in each of the storage resources, as well as the number and size of files contained in the storage resources for each user of the client computer; the occurrence and frequency of updates to the files; frequency of backups for each of the files; and other information. In addition, the agent gathers information related to the client computer itself including: CPU speed; amount of random access memory (RAM), and operating system revision. The information may be gathered periodically, such as daily, weekly or monthly, and sent to the SRM server also periodically in response to a request from the SRM server. The information may be processed in the SRM agent to reduce the total quantity of information to be sent to the SRM server. The SRM server further processes the data to develop weekly and/or monthly trends, sort the data by data type, user type, computer client type, or according to some other parameters.

In one illustrative embodiment of the present invention, which will now be described, the storage resource management system is designed for use with computer networks having Microsoft Windows NT® servers and workstations. Embodiments of the storage resource management system are adaptable for use with Windows NT® servers and workstations configured in a single domain environment, a multiple domain environment or as a workgroup.

In one embodiment, the SRM server is implemented as an independent program installed in a Windows NT® server. In this embodiment, the program is written primarily in C++, such as Microsoft Visual C++, and has binary library component adhering to the Microsoft COM standard and written in C++. In addition, the program includes components consisting of HTML pages and active server pages written in HTML, DHTML, VBScript, Javascript, and JAVA. In a preferred embodiment, the Windows NT® server containing the SRM server includes at least the following hardware: an Intel® Pentium Processor (preferably a Pentium 233); 128 MB of random access memory (RAM); 1 GB of free disk space for the SRM database including 15 MB for initial installation, 2 MB for general management of each SRM agent computer, 3 MB for every disk partition on an SRM agent computer, 2 MB per user with an account on an SRM agent computer, and enough. free space to accommodate a backup copy of the SRM database; and a CD ROM drive to allow installation of the SRM server on the computer using a compact disk containing SRM server software.

In addition, it is preferred that the Windows NT® server containing the SRM server includes at least the following software: Microsoft Windows NT® Server Version 4.0 with Service Pack 3 or higher; Remote Procedure Call (RPC); TCP/IP; a web browser such as Microsoft Internet Explorer Version 4.01 or higher; Microsoft Internet Information Server (IIS) Version 4.0 or higher.

The SRM agent is implemented as an independent program written in Microsoft® Visual C++ and installed in a Windows NT® workstation or server. In a preferred embodiment, the Windows NT® server or workstation containing the SRM agent includes at least the following hardware: an Intel-compatible Pentium processor or a Digital Alpha processor; 16 MB of RAM; 3 MB of available disk space; and a CD ROM drive to allow installation of the SRM agent on the computer using a compact disk containing SRM agent software.

In addition, it is preferred that the SRM agent computer contain the following software: Microsoft Windows NT® Server or Workstation 4.0 with Service Pack 3 or Microsoft Windows NT® Server or Workstation 3.51 with Service Pack 5; Remote Procedure Call (RPC); TCP/IP; and a web browser such as Microsoft Internet Explorer Version 4.01 or higher.

In the illustrative embodiment, the SRM agent can be installed across Windows NT® domains and workgroups. However, if the SRM server is in a domain, it is preferred that each SRM agent be installed in the same domain as the SRM server, in another domain that has a trusted connection to the server login account's domain, or in a workgroup. If the SRM server is installed in a Windows NT® workgroup, it is preferred to install the SRM agent in a workgroup as well, but not necessarily in the same workgroup as the SRM server.

In the illustrative embodiment, the SRM user interface consists of a workstation in the computer network having a web browser, such as Microsoft Internet Explorer Version 4.01, or higher, that allows the workstation to access the SRM server. The SRM server contains active server pages which contain VBScript, JavaScript and C++ code that accesses the SRM database and generates HTML-based web pages that are provided to the user. Accordingly, the functions of the user interface of this embodiment are performed by the user interface workstation in conjunction with the SRM server. In one embodiment, the SRM server or one of the SRM agents may also function as the SRM user interface. Additionally, other computers capable of accessing the SRM server may function as the user interface. In another embodiment, a web browser shortcut is installed as part of the user interface to allow a user to access the web server using a single click of a mouse. The web browser shortcut starts the web browser at a particular, predetermined location.

Figure 4:
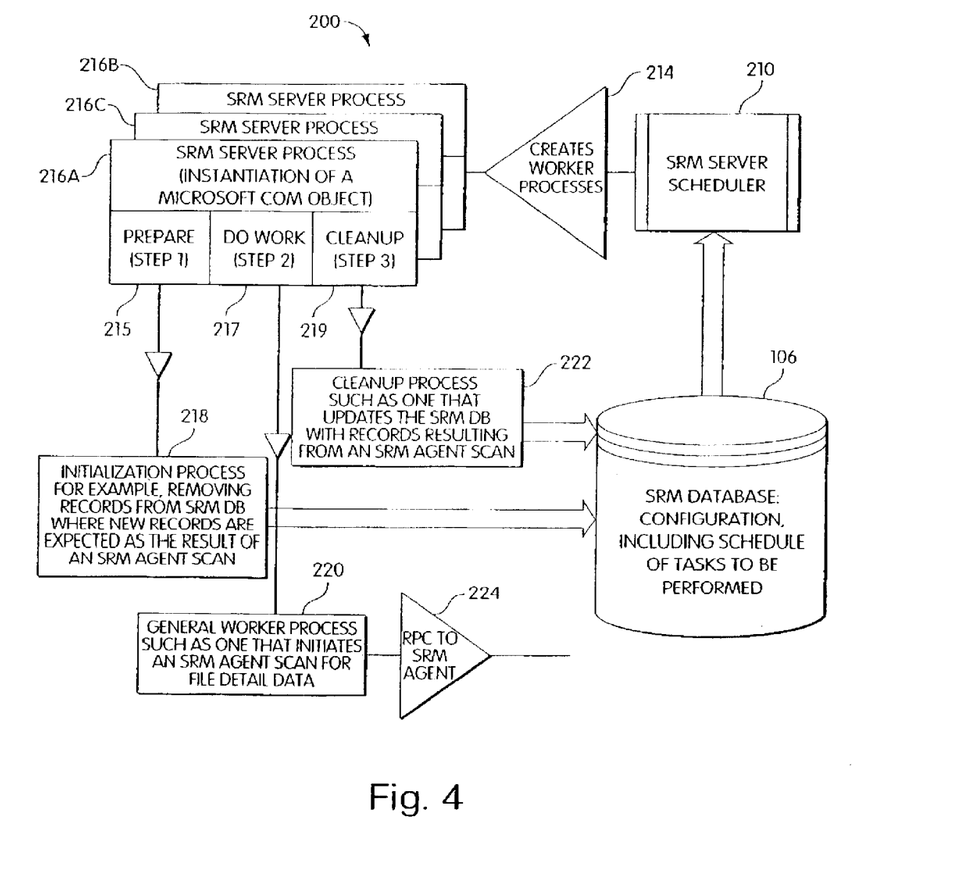
FIG. 4 is a flow chart of the process flow of an SRM server used in the storage resource management system of FIG. 2.

The SRM server functions as a central controller for storage management resource systems of the present invention. FIG. 4 shows a flow chart describing the operational procedure 200 of the SRM server. The SRM server includes an SRM server scheduler 210 that creates worker processes 216a, 216b and 216c (in step 214) performed by the SRM server based on a predetermined schedule. In one embodiment, the worker processes are created based on Microsoft COM objects that are stored in the SRM database 106 along with a registration ID. The SRM server scheduler retrieves the COM objects using the registration IDs. Each of the SRM server processes has three major steps identified as a preparation step 215, a work step 217, and a cleanup step 219.

In one illustrative example shown in FIG. 4, a server process 216a is created to initiate an SRM agent scan. In the example in FIG. 4, the preparation step includes an initialization process 218 that is used to remove records from the database 106 that will be updated using the results of the SRM agent scan. The work step of the server process 216a is a general worker process 220 that initiates an SRM agent scan to obtain file detail data for one of the computers in the network having an SRM agent. The general worker process 220 generates an RPC in step 224 to the SRM agent. In the cleanup step 222 of the server process 216a, information in the SRM database is updated with records resulting from the SRM agent scan.

Figure 5:
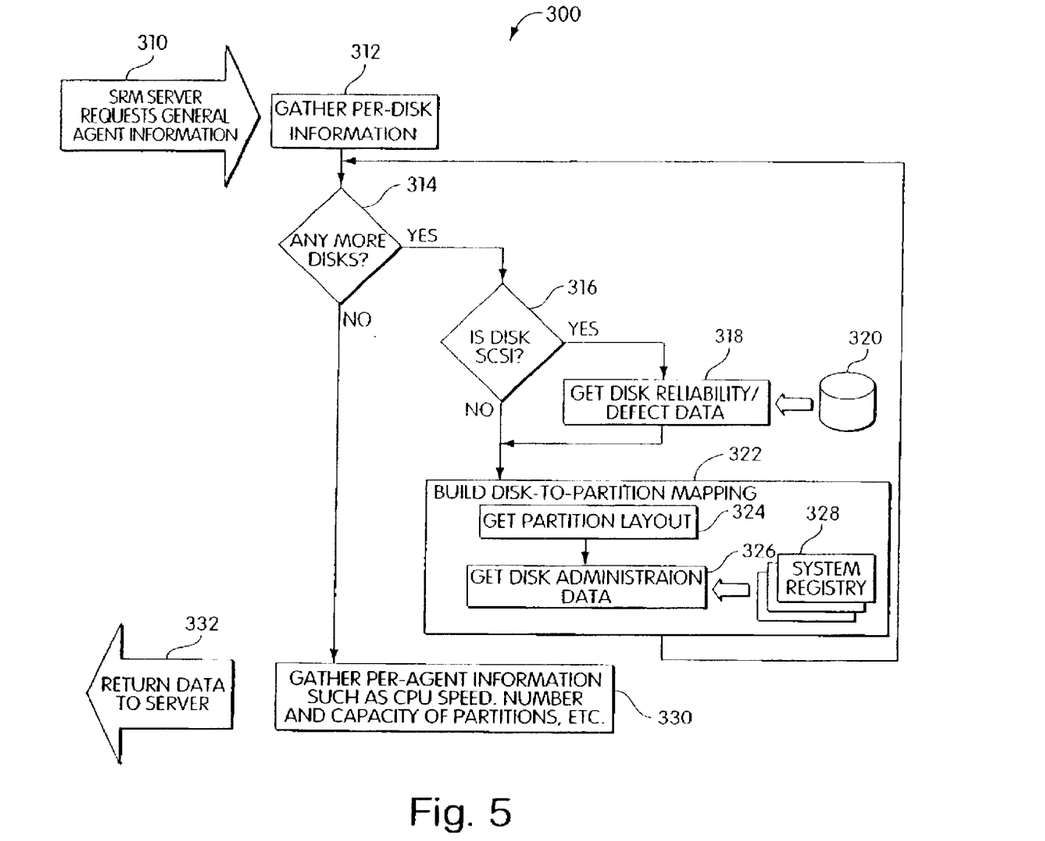
FIG. 5 is a flow chart of a process used by an SRM agent to gather general information from a client computer in one embodiment of the present invention.

The procedures used by the server agents to respond to remote procedure calls (RPCs) will now be described with reference to FIGS. 5 and 6. FIG. 5 shows a flow chart describing the procedure 300 by which an SRM agent responds to a request 310 by the SRM server for general agent information. In embodiments of the present invention, a request for general agent information is made to an SRM agent when the agent is initially installed in a client computer and then periodically, based on a schedule that can be modified.

In response to the request 310, in step 312, the SRM agent begins to gather information for each disk contained within the storage resources of the client computer of the SRM agent. Next, in decision block 314 a determination is made as to whether there are any more disks for which information has not been gathered. If the outcome of decision block 314 is "YES" then the process continues to decision block 316 where a determination is made as to whether the selected disk is a SCSI disk. If the outcome of decision block 316 is "YES", then the process continues to step 318 wherein disk reliability/defect data is collected from the SCSI disk 320. After step 318, or if the outcome of decision block 316 is "NO", the process continues to step 322 wherein disk-to-partition mapping is built for the selected disk. Step 322 includes steps 324 and 326. In step 324, partition layout for the selected disk is obtained from the NT registry and from NT system calls in the client computer, and in step 326, disk administration data from the selected disk is obtained from the system registry 328 contained within Microsoft Windows NT.

After the completion of step 322, process 300 returns to decision block 314. After information for all disks of the storage resources of the client computer for the SRM agent have been gathered, then the outcome of decision block 314 will be "NO". The process then continues with step 330 wherein information about the client computer is gathered. This information includes CPU speed, number, capacity and free space of partitions, volume characteristics of partitions, such as file system type, and disk characteristics, such as manufacture, rotational speed, defects and revision. The information gathered in process 300 is then returned in step 332 to the SRM server where it is compiled, processed and stored in the SRM database.

Figure 6:
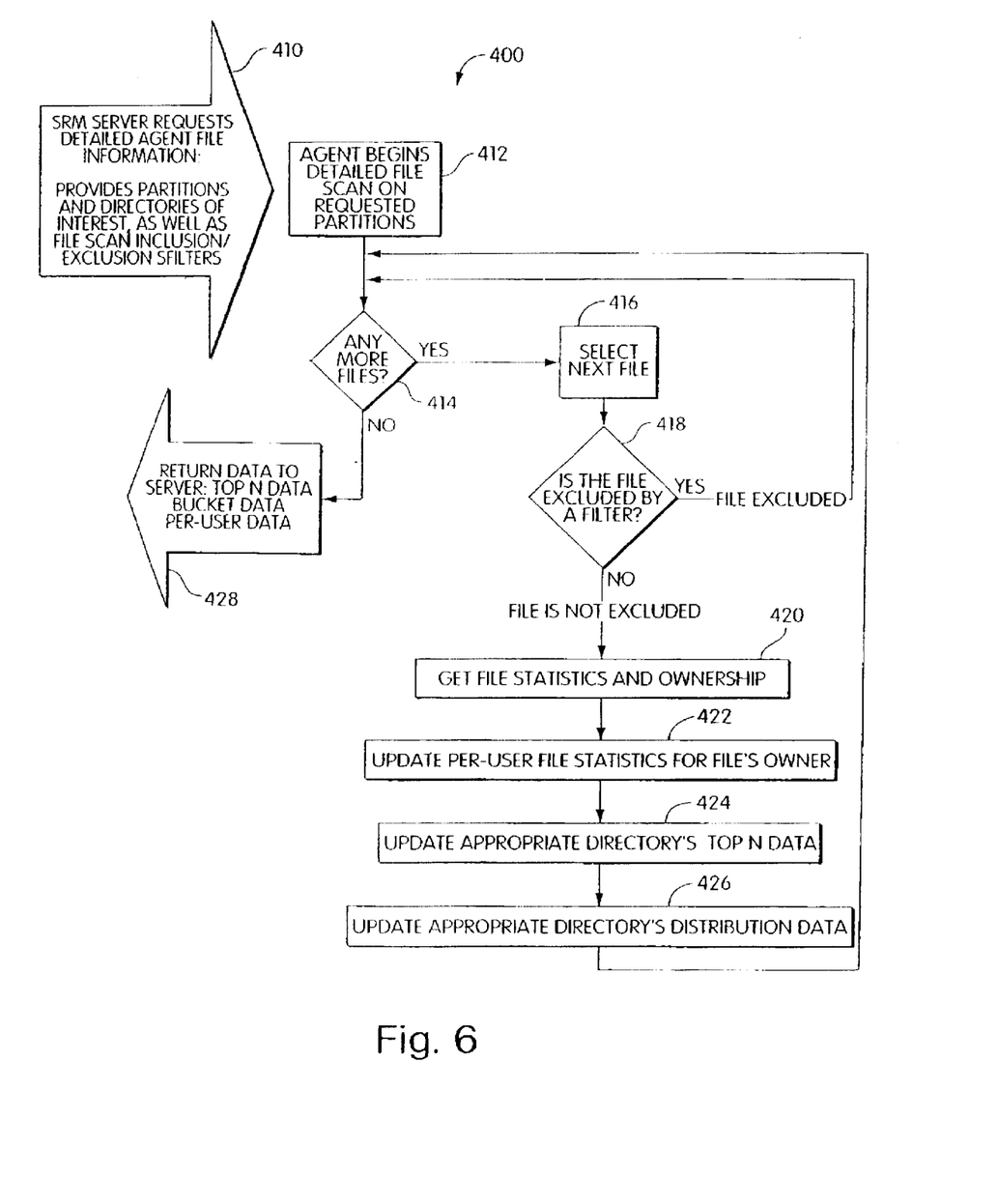
FIG. 6 is a flow chart of a process used by an SRM agent to gather detailed information from a client computer in one embodiment of the present invention.

FIG. 6 shows the procedure 400 by which an SRM agent responds to a request 410 by the SRM server for detailed agent information. The request from the SRM server includes particular directories and partitions of interest and may also include file scan inclusion or exclusion filters. In embodiments of the present invention, a request for detailed agent information is made to an SRM agent periodically based on a user adjustable schedule contained within the SRM server database. Through the use of the inclusion filters and exclusion filters, and the selectivity of partitions and directories of interest, selected types of disk information may be sent to the SRM server more frequently than other types of disk information.

Process 400 begins with step 412 wherein the SRM agent begins to conduct detailed file scans on requested partitions. In decision block 414, a determination is made as to whether there are any more files to scan. If the outcome of decision block 414 is "YES", then in step 416 a next file is selected. Then, in decision block 418 the selected file is compared to any filters contained in the request 410 to determine if the selected file is excluded by the filters. If the outcome of decision block 418 is "YES", then the process returns to decision block 414. If the outcome of decision block 418 is "NO", then the process continues with step 420. In step 420, the agent gathers information concerning ownership and statistics of the selected file, such as bytes of disk space occupied by the file. Next, in step 422, the SRM agent updates per user file statistics for the owner of the selected file. For example, if the selected file is owned by User A, then the storage space occupied by the selected file will be added to the total storage space being utilized by User A.

The process 400 continues with step 424 wherein Top N data for an appropriate directory or category is updated if necessary. The Top N data for a category or directory includes a listing of the top N files, users or some other parameter when sorted according to a descriptor such as largest, most recently accessed, oldest, etc. The process 400 then continues in step 426, wherein the distribution data for the appropriate directory for the selected file is updated. The distribution data, or bucket data, includes counts and sizes of files in selected categories such as size, age and backup status. At the completion of step 426, process 400 returns to decision block 414. Once all files have been scanned, and the data is processed in steps 420–426, then the outcome of decision block 414 will be "NO". Data, including Top N data, bucket data and per user data is then returned to the SRM server in step 428.

Figure 7:
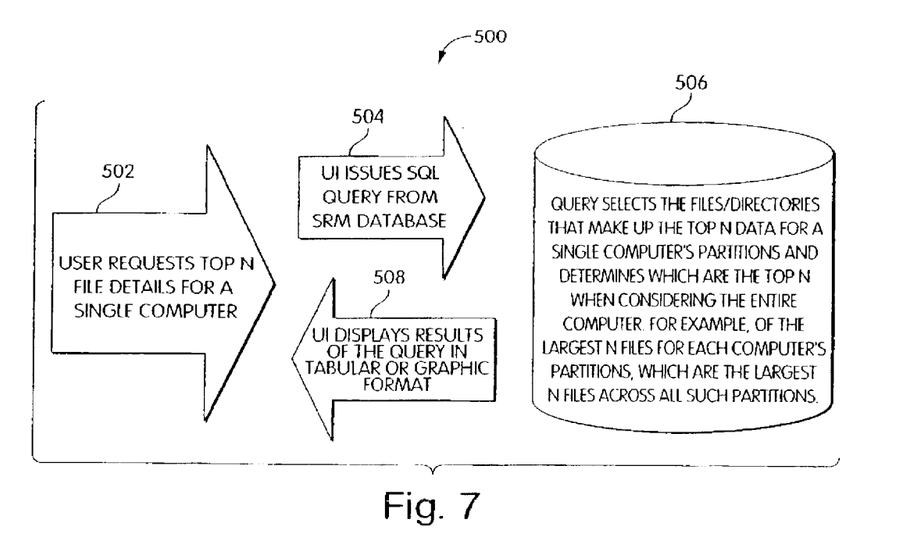
FIG. 7 is a flow chart of a process used by the storage resource management system of FIG. 2 to respond to a request by a user for file details of a single computer in a computer network.

The process by which embodiments of a storage resource manager respond to user requests for data will now be described with reference to FIGS. 7–10. FIG. 7 shows a process 500 for responding to a request 502 by a user for Top N file details for a single computer of a managed computer network. A request for data is initiated by the generation of an SQL query for the SRM database (step 504) by the user interface in response to the request 502. As shown in block 506 of FIG. 6, in response to the query, the files and directories that comprise the Top N files/directories for each partition for the single computer are selected and a determination is made as to which of the selected files/directories represent the Top N when the entire computer is considered. The user interface then displays (block 508) the result of the query in tabular or graphical form.

Figure 8:
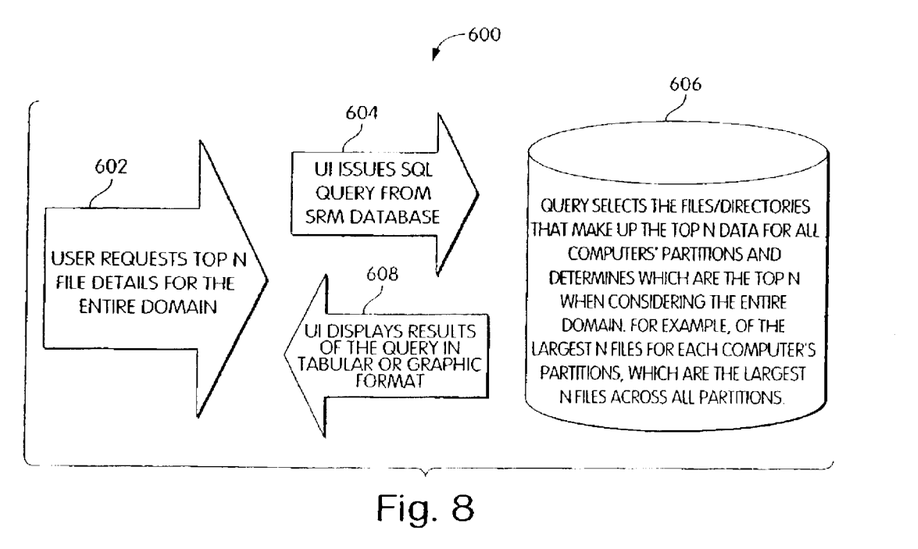
FIG. 8 is a flow chart of a process used by the storage resource management system of FIG. 2 to respond to a request by a user for file details of the entire domain managed by the storage resource management system.

FIG. 8 shows a process 600 for responding to a request 602 by a user for Top N file details for the entire domain containing the SRM server. In block 604 of process 600, the user interface generates an SQL query based on the request from the user. As shown in block 606 of FIG. 8, in response to the query, the files and directories that comprise the Top N files/directories for all computers' partitions are selected and a determination is made as to which of the selected files/directories represent the Top N when the entire domain is considered. The user interface then displays (block 608) the result of the query in tabular or graphical form.

Figure 9:
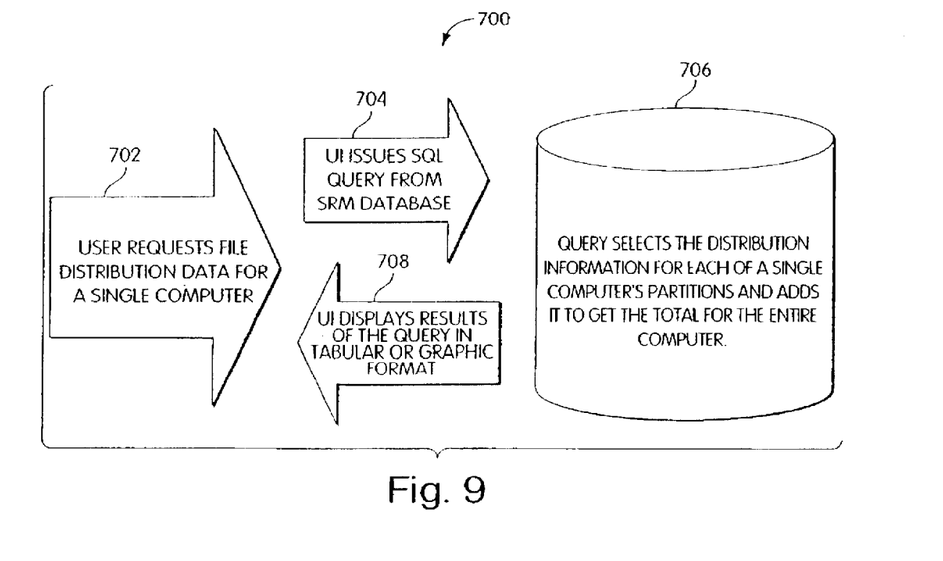
FIG. 9 is a flow chart of a process used by the storage resource manager of FIG. 2 to respond to a request by a user for file distribution data of a single computer.

FIG. 9 shows a process 700 for responding to a request 702 by a user for the file distribution data of a single computer. In block 704 of process 700, the user interface generates an SQL query based on the request from the user. As shown in block 706 of FIG. 9, in response to the query, the file distribution data for each of the partitions of the single computer is gathered and totaled to provide the distribution data for the entire computer. The user interface then displays (block 708) the result of the query in tabular or graphical form.

Figure 10:
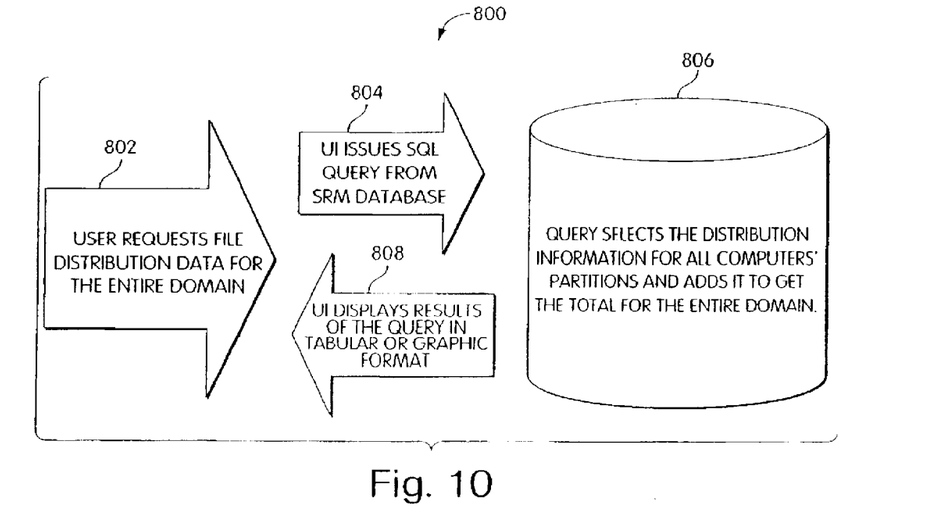
FIG. 10 is a flow chart of a process used by the storage resource management system of FIG. 2 to respond to a request by a user for file distribution data of the entire domain managed by the storage resource management system.

FIG. 10 shows a process 800 for responding to a request 802 by a user for the file distribution data of the entire domain containing the SRM server. In block 804 of process 800, the user interface generates an SQL query based on the request from the user. As shown in block 806 of FIG. 10, in response to the query, the file distribution data for each of the partitions of each of the computers in the domain is gathered and totaled to provide the distribution data for the entire domain. The user interface then displays (block 808) the result of the query in tabular or graphical form.

There are several advantages provided by embodiments of the storage resource manager of the present invention. First, the division of processing and compilation tasks between the SRM agent, SRM server and user interface allows processing to occur in an efficient manner. Second, the storage resources of computer systems of a computer network can be centrally managed while allowing for local access to the storage resources. In addition, the use of a central database and server along with a user interface that incorporates a web browser provides a central single point of collection for storage resource information that can be accessed from a plurality of locations.

Embodiments of the storage resource management systems of the present invention allow network administrators, system administrators and information technology managers to more easily monitor and manage storage resources by providing the following advantages:

Management of Storage Resources According to Definable Logical Groups. The storage resources of computers can be managed in accordance with logical groups comprising members that may be physically located in different facilities. For example, all engineers of a company may be members of a logical group titled engineering group. Storage resource alert notifications, maximum storage allocation, backup philosophies, and other storage parameters can be uniquely set and monitored for this group to identify specific storage needs of this group.

Management of Disk Space and Disk Health. By monitoring daily and weekly trends for attributes of individual disks such as grown defects, a defective disk, or soon to be defective disk, can be detected before an actual failure of the disk or disk drive containing the disk occurs.

Storage Resources Asset Management and Control. An immediate inventory of storage resources, including detailed hardware and software descriptions can be obtained.

File Demographics. The number of files, types of files and size of files contained within storage resources or within logical partitions of storage resources can be readily determined to allow a network manager to determine if the resources are being used in the most efficient manner and to determine whether the logical partitioning should be changed.

User Demographics The use of storage resources by individual users or groups of users can be monitored to assist in setting proper storage limits, to analyze storage trends of individual users, and to ensure efficient use of storage resources by users.

Capacity Planning/Load Balancing Using trend data, the rate at which resources are being filled can be determined to assist in planning and justifying deployment of new storage resources. Resource capacity data can also be used to provide optimal use of existing resources through load balancing.

Managing and Setting Backup Strategies Trend data can be used to determine the rate at which incremental backups are growing to determine when and if the incremental backups will exceed the network's backup window. Vulnerable file reports can be generated to determine the number of and which particular files have been modified and not backed up.

In embodiments of the present invention described above, one SRM agent is installed in each computer system of a computer network. In other embodiments of the present invention, an SRM agent is not installed in all computers of a network, but only in those for which it is desired to provide detailed storage resources management. For those computers of the network not having an SRM agent, the system information of these computers can still be gathered by the SRM server by providing RPC calls to these computers. In addition, embodiments of the present invention have been described as being used with a computer network shown in FIG. 1. The computer network of FIG. 1 represents only one type of network that can be used with embodiments of the present invention.

Having thus described at least one illustrative embodiment of the invention, various alterations, modifications and improvements will readily occur to those skilled in the art. Such alterations, modifications and improvements are intended to be within the scope and spirit of the invention. Accordingly, the foregoing description is by way of example only and is not intended as limiting. The invention's limit is defined only in the following claims and the equivalents thereto.

What is claimed is:

1. A storage management system for managing storage resources of a plurality of computer devices in a computer network, the computer network including a server operatively coupled to each of the plurality of computer devices, the storage management system comprising:

a plurality of management agents, each of which is installed in a corresponding one of the plurality of computer devices, and each of which is configured to compile storage information of storage resources accessible by the corresponding computer device to create a first set of compiled storage information, the management agents being configured to gather information regarding available storage space of the storage resources as at least a part of the storage information;

a storage manager installed in the server and operatively coupled to each of the plurality of management agents through the computer network, the storage manager being configured to collect the first set of compiled storage information from each of the management agents and to further compile the first sets of storage information received to create a second set of compiled storage information; and a user interface operatively coupled to the storage manager to allow a user to access the second set of compiled storage information.

2. The storage management system of claim 1, wherein the plurality of computer devices includes a first group of computer devices and a second group of computer devices, each of the first group and the second group having computer devices of a first type, and wherein the storage manager is configured to compile storage information of the first type of computer devices in the first group with storage information of the first type of computer devices in the second group to create a third set of storage information.

3. The storage management system of claim 2, wherein computer devices are categorized as being of the first type based on characteristics of users of the computer devices.

4. The storage management system of claim 2, wherein each of the first group and the second group include computer devices of a second type, and wherein the storage manager is configured to compile storage information of the second type of computer devices in the first group with storage information of the second type of computer devices in the second group to create a fourth set of storage information.

5. The storage management system of claim 4, wherein computer devices are categorized as being one of the first type or the second type based on characteristics of users of the computer devices.

6. The storage management system of claim 5, wherein the user interface includes a web browser to access the storage manager.

7. The storage management system of claim 6, wherein one of the plurality of management agents is installed in the server to manage storage resources of the server.

8. The storage management system of claim 7, wherein the user interface is installed in one of the computers of the computer network containing one of the plurality of management agents.

9. The storage management system of claim 7, wherein the user interface is installed in the server.

10. The storage management system of claim 6, wherein the storage manager is constructed and arranged to collect information from computers of the computer network having a management agent and to collect information from computers of the computer network that do not contain a management agent.

11. The storage management system of claim 1, wherein the user interface includes a web browser to access the storage manager.

12. The storage management system of claim 1, wherein one of the plurality of management agents is installed in the server to manage storage resources of the server.

13. The storage management system of claim 1, wherein the user interface is installed in one of the computers containing one of the plurality of management agents.

14. The storage management system of claim 1, wherein the user interface is installed in the server.

15. A method for managing storage resources of a plurality of computer devices in a computer network, the method comprising steps of:

for each computer of the computer network, compiling storage information of storage resources accessible by the computer to create a first set of compiled storage information, the storage information including information regarding available storage space of the storage resources;

collecting the first set of compiled storage information from each of the computers;

compiling the first sets of storage information collected to create a second set of compiled storage information;

storing the second set of compiled information; and accessing the second set of compiled information;

wherein compiling the storage information to create the first set for each computer is performed locally to each computer of the computer network; and wherein the collecting is performed by a server via the computer network.

16. The method of claim 15, wherein the step of storing includes storing the storage information in a database contained in a server of the computer network.

17. The method of claim 16, wherein the step of accessing includes accessing the database of the server using a web browser.

18. The method of claim 17, wherein the step of accessing includes a step of further compiling the storage information contained in the database.

19. The method of claim 18 wherein at least one of the steps of compiling includes compiling data according to types of users of computers of the computer network.

20. The method of claim 15, wherein the step of accessing includes accessing the second set of compiled information using a web browser.

21. The method of claim 15 wherein the step of accessing includes a step of further compiling the second set of compiled information.

22. The method of claim 15 wherein at least one of the steps of compiling includes compiling data according to types of users of computers of the computer network.

23. A storage management system for managing storage resources of a plurality of computer devices in a computer network, the computer network including a server operatively coupled to each of the plurality of computer devices, the storage management system comprising:

first means, included within each one of the computers of the computer network, for compiling storage information of storage resources accessible by the one of the computers to create a first set of compiled storage information, the first means being configured to gather information regarding available storage space of the storage resources as at least apart of the storage information;

means, coupled to the first means, for collecting the first set of compiled storage information from each of the computers;

second means, coupled to the means for collecting, for compiling the first sets of storage information collected to create a second set of compiled storage information; and user interface means for accessing the second set of compiled information;

wherein the collecting means is coupled to the first means via the computer network and the collecting means and the second means are disposed in the server.

24. The storage management system of claim 23, wherein the means for collecting includes means for storing the storage information in a database.

25. The storage management system of claim 24, wherein the user interface means includes a web browser.

26. The storage management system of claim 25, wherein the user interface means includes means for further compiling the storage information contained in the database.

27. The storage management system of claim 26 wherein at least one of the first means for compiling and the second means for compiling includes means for compiling data according to types of users of computers of the computer network.

28. The storage management system of claim 23, wherein the user interface means includes a web browser.

29. The storage management system of claim 23, wherein the user interface means includes means for further compiling the storage information.

30. The storage management system of claim 29 wherein at least one of the first means for compiling and the second means for compiling includes means for compiling data according to types of users of computers of the computer network.

31. The storage management system of claim 1 wherein the storage information includes at least one of: number of files in each storage resource, size of files in each storage resource, number of files in each storage resource for each user, size of files in each storage resource for each user, occurrence of updates to files, frequency of updates to files, and frequency of backups for files.

32. The method of claim 15 wherein the storage information includes at least one of: number of files in each storage resource, size of files in each storage resource, number of files in each storage resource for each user, size of files in each storage resource for each user, occurrence of updates to files, frequency of updates to files, and frequency of backups for files.

33. The method of claim 15 wherein the compiling of storage information and the first sets, the collecting, the storing, and the accessing are repeated periodically.

34. The storage management system of claim 23 wherein the storage information includes at least one of: number of files in each storage resource, size of files in each storage resource, number of files in each storage resource for each user, size of files in each storage resource for each user, occurrence of updates to files, frequency of updates to files, and frequency of backups for files.

* * * * *

UNITED STATES PATENT AND TRADEMARK OFFICE
CERTIFICATE OF CORRECTION

PATENT NO.    : 6,430,611 B1
DATED         : August 6, 2002
INVENTOR(S)   : Kita et al.

It is certified that error appears in the above-identified patent and that said Letters Patent is hereby corrected as shown below:

<u>Title page,</u>
Item [75], Inventors, "Mark B. Hecker, Marlboro" should read -- Mark B. Hecker, Northboro --.
Item [73], Assignee reads "Highground Systems, Inc." should read -- Sun Microsystems, Inc. --.

Signed and Sealed this

Tenth Day of December, 2002

JAMES E. ROGAN
*Director of the United States Patent and Trademark Office*